(12) United States Patent
    Kracke (10) Patent No.: US 11,174,901 B2
(45) Date of Patent: Nov. 16, 2021

(54) TORQUE LIMITING DEVICE

(71) Applicant: Goodrich Actuation Systems Limited, Solihull (GB)

(72) Inventor: Jeremy Kracke, Stone (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 59 days.

(21) Appl. No.: 16/711,856

(22) Filed: Dec. 12, 2019

(65) Prior Publication Data

US 2021/0018045 A1    Jan. 21, 2021

(30) Foreign Application Priority Data

Jul. 19, 2019    (EP) .................................... 19187435

(51) Int. Cl.
    *F16D 7/10*    (2006.01)
    *F16D 7/02*    (2006.01)

(52) U.S. Cl.
    CPC .............. *F16D 7/10* (2013.01); *F16D 7/022* (2013.01)

(58) Field of Classification Search
    CPC .......... F16D 7/021; F16D 7/022; F16D 7/048; F16D 7/06; F16D 7/10; F16D 41/066; F16D 43/204; F16D 43/208; F16D 43/21; F16D 43/211
    USPC ......................................... 464/30, 34, 37, 41
    See application file for complete search history.

(56) References Cited

U.S. PATENT DOCUMENTS

| 3,640,092 A | | 2/1972 | Neal et al. | |
| 4,386,689 A | * | 6/1983 | Kato | .......................... F16D 7/10 464/37 |
| 5,788,021 A | * | 8/1998 | Tsai | .......................... B25B 21/00 188/67 |
| 10,570,963 B2 | * | 2/2020 | Davies | .................... F16D 43/02 |
| 10,738,837 B2 | * | 8/2020 | Trybu a | .................... F16D 7/10 |
| 11,028,886 B2 | * | 6/2021 | Kracke | .............. F16D 43/2024 |

FOREIGN PATENT DOCUMENTS

| DE | 102009021396 A1 | 12/2010 |
| EP | 3447325 A1 | 2/2009 |
| EP | 3222869 A1 | 9/2017 |

OTHER PUBLICATIONS

Extended European Search Report for International Application No. 19187435.3 dated Dec. 6, 2019, 6 pages.

* cited by examiner

*Primary Examiner* — Josh Skroupa

(74) *Attorney, Agent, or Firm* — Cantor Colburn LLP (57) ABSTRACT

A torque limiting device comprises rotationally mounted input and output shafts, an intermediate drive element rotationally coupled to the input shaft and a plurality of jammer elements mounted between the intermediate drive element and the output shaft. A spring mechanism is connected between the input shaft and the intermediate drive element for aligning the intermediate drive element and the input shaft in a driving configuration in which rotation of the input shaft at a torque below a predetermined threshold is transmitted to the output shaft via the jammer element, but in which torque above the predetermined threshold moves the input shaft rotationally relative to the intermediate drive element against the force of the spring mechanism so as to disengage that jammer elements from driving engagement with the output shaft.

15 Claims, 7 Drawing Sheets

TORQUE LIMITING DEVICE

FOREIGN PRIORITY

This application claims priority to European Patent Application No. 19187435.3 filed Jul. 19, 2019, the entire contents of which is incorporated herein by reference.

TECHNICAL FIELD

The present disclosure relates to a torque limiting device as may be used, for example in aircraft actuator systems.

BACKGROUND

Aircraft employ actuators for operating various components such as leading edge slats, trailing edge flaps and control surfaces. Drive to the actuator is provided from a drive motor which is connected to the actuator by means of a drive transmission shaft. In the event that an actuator or driven component jams, a high impulse torque may be applied to the actuator system as the motor decelerates very rapidly. This is undesirable as damage may occur to the actuator system. Accordingly it is desirable that a mechanism be provided to mitigate against such high impulse torques.

SUMMARY

From a first aspect, the disclosure provides a torque limiting device comprising a rotationally mounted input shaft, a rotationally mounted output shaft and an intermediate drive element rotationally coupled to the input shaft. A plurality of jammer elements is mounted between the intermediate drive element and the output shaft. The device further comprises a spring mechanism connected between the input shaft and the intermediate drive element for aligning the intermediate drive element and the input shaft in a driving configuration in which rotation of the input shaft at a torque below a predetermined threshold is transmitted to the output shaft via the jammer elements, but in which torque above the predetermined threshold moves the input shaft rotationally relative to the intermediate drive element against the force of the spring mechanism so as to disengage that jammer elements from driving engagement with the output shaft.

In this manner, torque above the predetermined threshold (which will be determined by the spring mechanism) will not be transmitted to the output shaft.

In certain embodiments, the intermediate drive element may comprise a plurality of circumferentially spaced depressions having ramped edge surfaces along which the jammer elements may move to engage a radially inner surface of the output shaft to transmit torque thereto. In certain embodiments, the jammer elements may be rollers.

In alternative embodiments, the input shaft and the intermediate drive element may have opposed pockets which receive pawls which may rotate or tilt into engagement with the radially inner surface of the output shaft to transmit torque thereto when the torque applied is less than the predetermined threshold.

A pawl may comprise a body with enlarged end portions. Thus the pawls may comprise curved convex end surfaces and curved concave side surfaces with projecting corners formed between the end surfaces and the side surfaces.

In embodiments of any of the above arrangements, the input shaft may comprise a first set of dog teeth each dog tooth comprising a clockwise facing flank and an opposed anti-clockwise facing flank and the intermediate drive element may comprise a second set of axially projecting dog teeth, each comprising a clockwise facing flank and an opposed anti-clockwise facing flank. The first and second sets of dog teeth may axially overlap, with the dog teeth of the first set of dog teeth circumferentially interposed between the dog teeth of the second set of dog teeth.

The flanks of the dog teeth of the input shaft may extend rearwardly into the input shaft to define pockets in the input shaft into which the dog teeth of the intermediate drive element extend. The flanks of the dog teeth of the intermediate drive element may extend rearwardly into the intermediate drive element to define pockets in the intermediate drive element into which the dog teeth of the input shaft extend.

In embodiments of any of the above arrangements, the input shaft may comprise a plurality of axially extending actuating fingers which extend circumferentially between the jammer elements such that rotation of the input shaft relative to the intermediate drive element will cause the axially extending fingers to engage the jammer elements to move the jammer elements out of driving engagement with the outer shaft.

In some embodiments of any of the above, the spring mechanism may comprise a torsion spring assembly.

The torsion spring assembly may comprise a torsion bar rotationally coupled to the input shaft and the intermediate element.

A first set of drive teeth may be rotationally coupled to a first end of the torsion bar and a second set of drive teeth rotationally coupled to a second end of the torsion bar. The first set of drive teeth and the second set of drive teeth may engage the flanks of the first and second sets of dog teeth for transmitting drive thereto.

In an alternative arrangement, the spring mechanism may comprise one or more compression springs arranged between the input shaft and the intermediate drive element. The springs may optionally be mounted in opposed pockets formed in opposed surfaces of the input shaft and intermediate drive element.

In any of the above embodiments, the device may be configured such that a rotation of the input shaft relative to the intermediate drive element of 8 degrees or less, for example 5 degrees or less, will uncouple the jammer elements from the output shaft and thereby disconnect the input shaft from the output shaft.

The disclosure also provides an actuator drive system comprising an actuator, a drive motor connected to the actuator via a drive transmission shaft and a torque limiting device in accordance with the disclosure arranged between the actuator and the motor, for example between the transmission shaft and the drive motor.

The drive motor may for example be an electric motor.

In embodiments the torque limiting device may be provided at an output to the drive motor.

The actuator drive system may be incorporated in an aircraft. The actuator may drive a wing leading edge slat of the aircraft.

The disclosure also provides a method of limiting torque transmitted from an input shaft to an output shaft. The method comprises transmitting torque from the input shaft via a plurality of jammer elements arranged between the output shaft and an intermediate drive element rotationally coupled to the input shaft through a pre-loaded spring mechanism such that the input shaft rotates with the intermediate drive element when the torque applied to the input shaft does not exceed a predetermined torque generated between the input shaft such that the jammer elements will remain in driving engagement with the output shaft, but application of a torque greater than the predetermined torque will cause rotation of the input shaft relative to the intermediate drive element thereby disengaging the driving engagement between the jammer elements and the output shaft.

BRIEF DESCRIPTION OF DRAWINGS

An embodiment of the disclosure will now be described, by way of example only with reference to the accompanying drawings in which.

DETAILED DESCRIPTION

Figure 1:
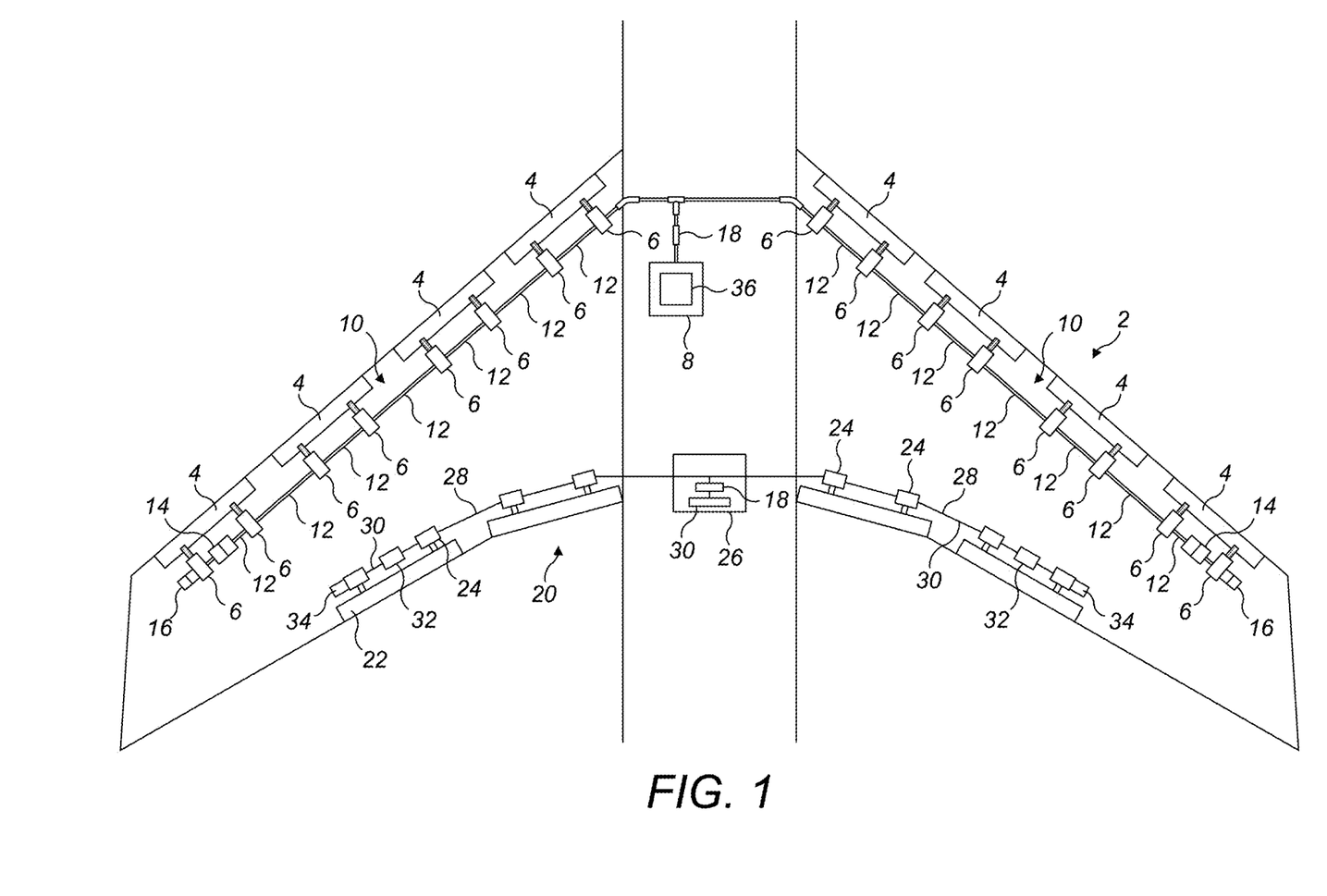
FIG. 1 illustrates an aircraft system comprising a torque limiting device in accordance with the disclosure.

FIG. 1 illustrates an aircraft comprising a slat operating system 2. The system 2 comprises a plurality of leading edge slats 4 on each wing which are selectively deployed and retracted by rotary actuators 6. Each actuator 6 is powered by a rotary drive from a common power drive unit 8. Drive is transmitted from the power drive unit 8 via a power transmission shaft 10, which typically may comprise one or more rotationally coupled sections 12, which connects the actuators 6 in series.

Out board brakes (OBBs) 14 and asymmetry sensors 16 may also be included in a typical system. The OBBs 14 and asymmetry sensors 16 are typically arranged at the ends of the respective power transmission shafts 10.

In accordance with the disclosure, torque limiting device 18 is arranged in the transmission shaft 10 between the drive unit 8 and the actuators 6.

Also illustrated is an aircraft flap operating system 20. This system 20 comprises a plurality of trailing edge flaps 22 which are selectively deployed and retracted by rotary actuators 24. Each actuator 24 is powered by a rotary drive from a common power drive unit 26. Drive is transmitted from the power drive unit 26 via a power transmission shaft 28, typically comprising one or more rotationally coupled sections 30, which connects the actuators 24 in series. The flap operating system 20 also comprises a torque limiting device 18 in accordance with the disclosure between the electric motor 36 and the power transmission shafts 28.

In a typical embodiment, the drive unit 8, 26 may comprise a motor 36 which provides a rotary output to the transmission shaft 10, 28. The motor 36 may be a hydraulic or pneumatic motor, but in the described embodiment is an electric motor. Such motors 36 may be high speed, low torque motors or lower speed higher torque motors. The former usually require gearing to reduce the rotational speed to provide a torque value compatible with that required to drive the actuators 6, 24. In any event, the referred inertia experienced by the transmission shaft 10, 28 from either motor arrangement will be high.

If a jam should occur in the transmission line 10, 28, the actuators 6, 24 or the slats 4 or flaps 22 (for example due to icing of the actuator or a tool inadvertently being left in the actuator, this will result in a high impulse torque being applied to the transmission shaft 10, 28 by the motor 36, many times greater than the torque required to drive the actuator. This may cause damage to the system. To mitigate this problem, the torque limiting devices 18 will limit the torque being transmitted from the motor 36 to the transmission shaft 10, 24 in the event of such a jam, thereby protecting the system from shock loads.

Turning now to the torque limiting device 18, this is described in greater detail with reference to FIGS. 2 to 6.

Figure 3:
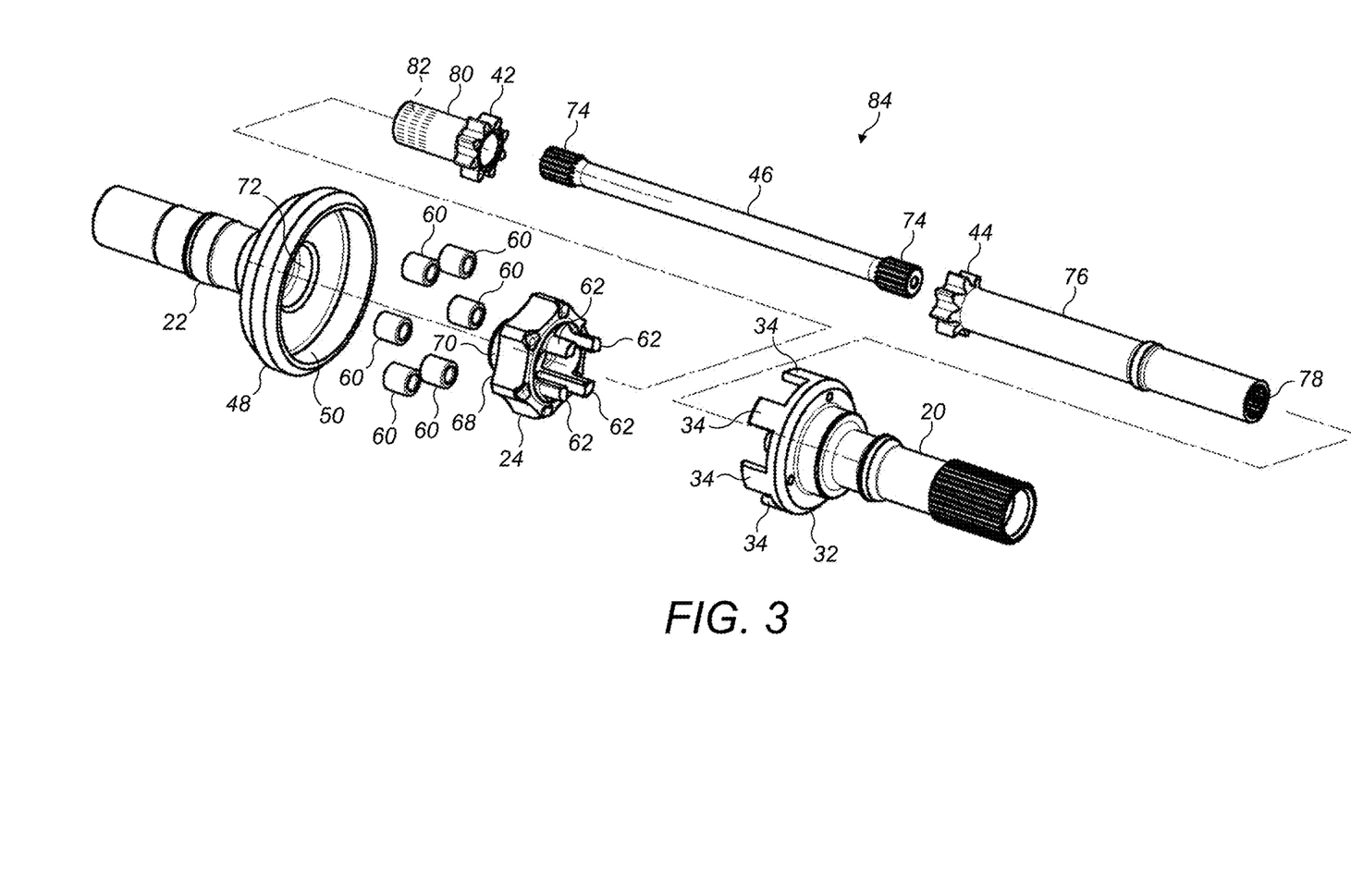
FIG. 3 illustrates an exploded view of the torque limiting device of FIG. 1.
Figure 4:
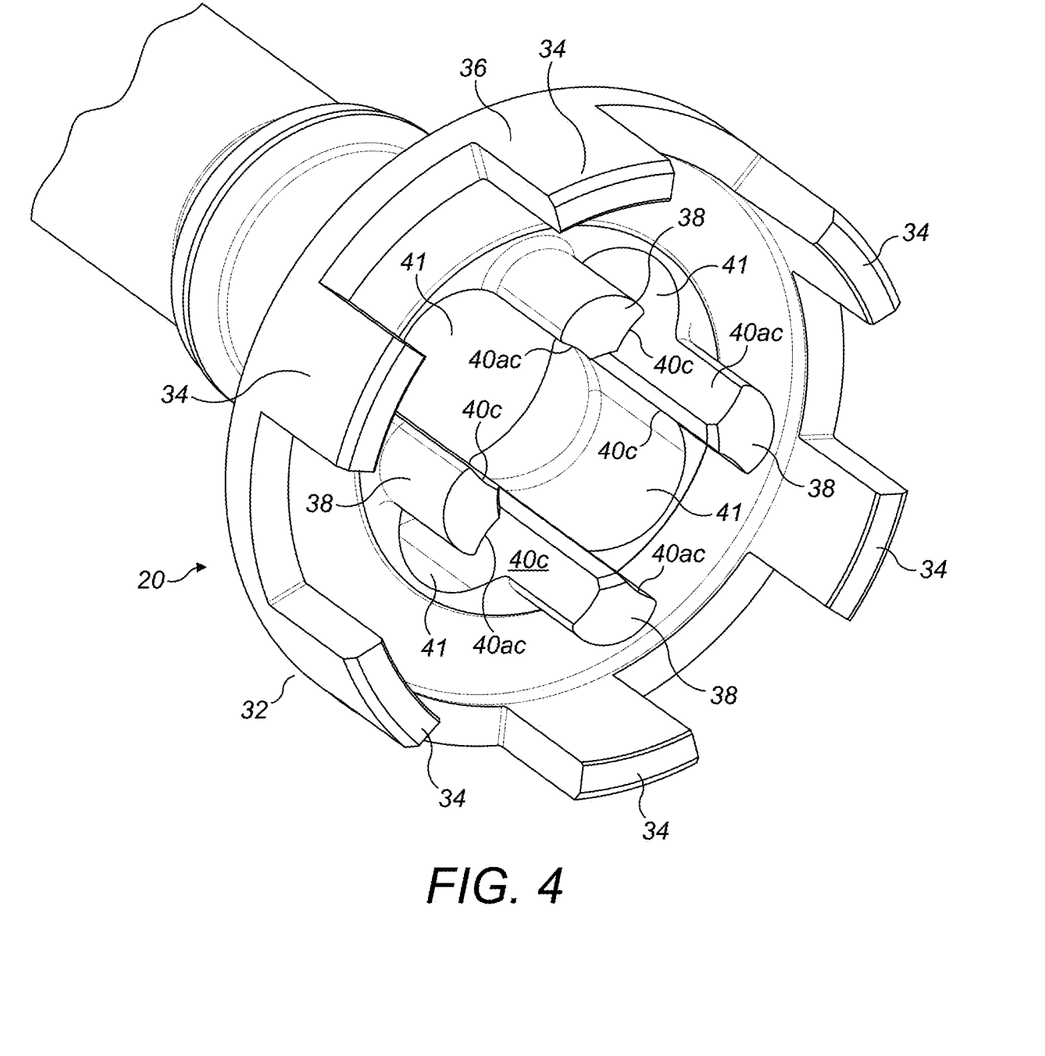
FIG. 4 shows a perspective view of the input shaft of the torque limiting device of FIG. 1.
Figure 5:
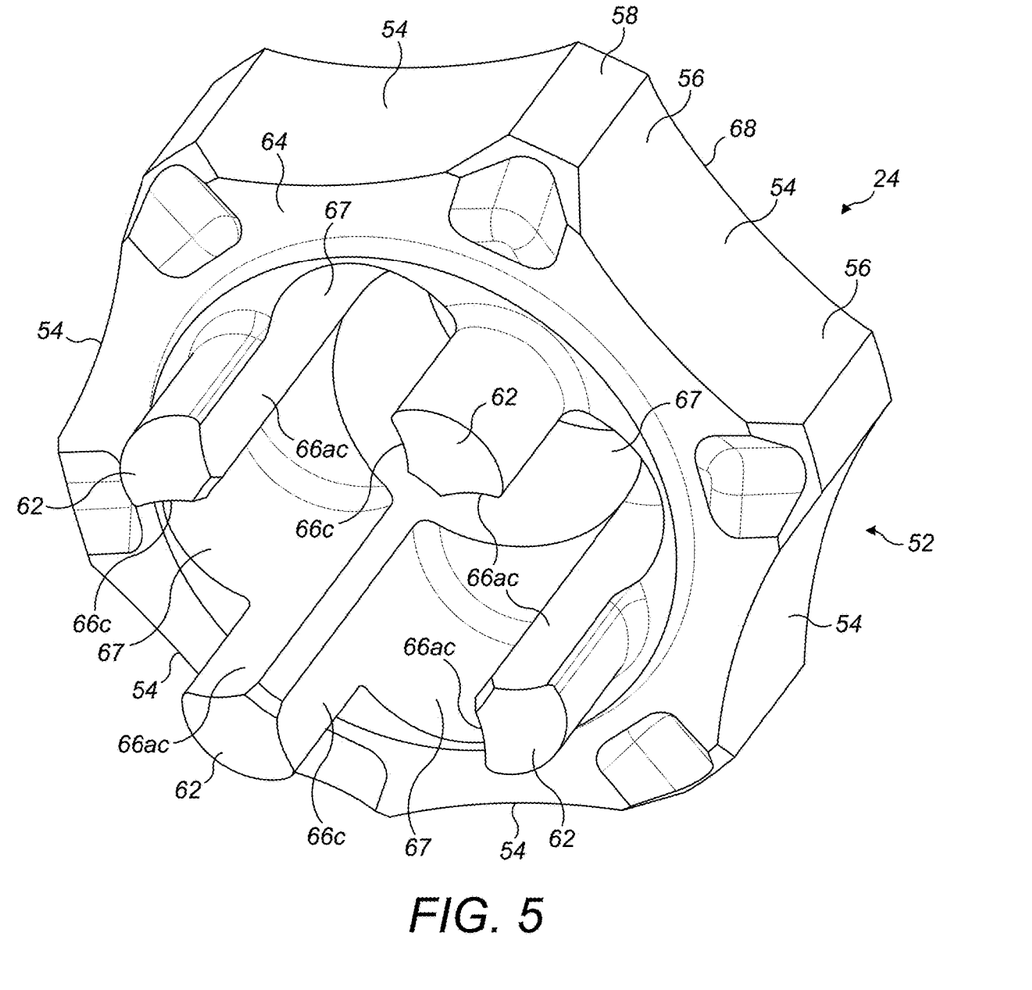
FIG. 5 shows a perspective view of the intermediate drive element of the torque limiting device of FIG. 1.

The torque limiting device 18 comprises an input shaft 20, an output shaft 22 and an intermediate drive element 24 (see FIG. 3). The input shaft 20 and output shaft 22 are rotatably mounted in a housing 26 (see FIG. 6). The housing 26 is not shown in detail as it does not form an important feature of the torque limiting device 18.

The input shaft 20, output shaft 22 and intermediate drive element 24 are arranged coaxially along an axis X.

The input shaft 20 is hollow and comprises input drive elements 28 such as splines or gear teeth 28 (FIG. 2) for receiving a rotary drive. The drive elements 28 may be arranged at a first end 30 of the input shaft 20 as shown. A second end 32 of the input shaft 20 comprises a plurality of circumferentially spaced, axially extending fingers 34. In this embodiment there are six fingers 34, but this number may be varied in other embodiments. The fingers 34 are arranged on the radially outer periphery 36 of the second end 32 of the input shaft 20.

The input shaft 20 further comprises a plurality of circumferentially spaced, axially extending dog teeth 38 arranged radially inwardly of the fingers 34 and extending axially from an axially facing surface 39 of the input shaft 20. In this embodiment there are four dog teeth 38 although this number may vary in other embodiments. As will be described further below, each dog tooth 38 comprises a pair of curved flanks 40 for receiving drive teeth 42, 44 rotationally coupled to a torsion bar 46 (see FIG. 3). The curved flanks 40 extend uninterrupted back into arcuate pockets 41 formed in the body of the input shaft 20 between adjacent dog teeth 38. Each dog tooth 38 comprises a clockwise facing flank 40c and an anti-clockwise facing flank 40ac.

Figure 2:
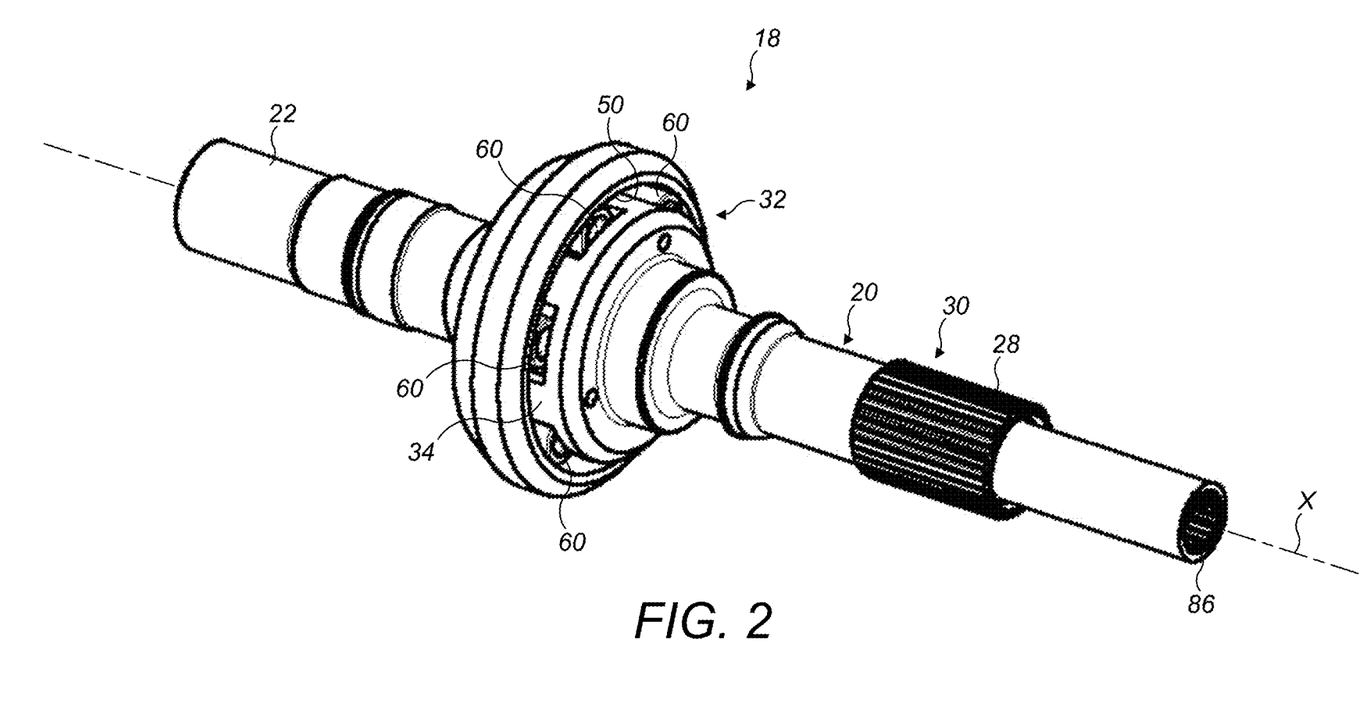
FIG. 2 illustrates the torque limiting device of FIG. 1.

The output shaft 22 is hollow and comprises a cup shaped end 48 which receives the intermediate drive element 24 and the fingers 34 of the input shaft 20. The radially inner surface 50 of the cup shaped end 48 is circular in cross-section and extends radially around the fingers 34 of the input shaft 20 as shown in FIG. 2.

The intermediate drive element 24 is hollow and comprises a lobed outer periphery 52. The outer periphery 52 comprises a plurality of circumferentially spaced shallow depressions 54, each depression having a ramped edge surface 56 extending to the outer diameter surface 58 of the intermediate drive element 24. As will be explained in further detail below, each depression 54 receives a roller jammer element 60 arranged between the intermediate drive element 24 and the radially inner surface 50 of the output shaft 22. In this embodiment, the depressions 54 are as circular arcs with a centre of curvature R (see FIG. 6). Other shapes of depression 54 are possible, however.

The intermediate drive element 24 further comprises a plurality of circumferentially spaced and axially extending dog teeth 62 extending from an axially facing surface 64 thereof. These dog teeth 62 are generally of the same cross-sectional shape as the dog teeth 38 of the input shaft 20. Accordingly, they too have curved flanks 66 for receiving the drive teeth 42, 44 rotationally coupled to the torsion bar 46. The curved flanks 66 extend back uninterrupted into arcuate pockets 67 formed in the body of the input shaft 20 between adjacent dog teeth 62. Each dog tooth 62 comprises a clockwise facing flank 66c and an anti-clockwise facing flank 66ac.

When the torque limiting device 18 is assembled the dog teeth 38 of the input shaft 20 extend into the arcuate pockets 67 of the intermediate drive element 24 and the dog teeth 62 of the intermediate drive element 24 extend into the arcuate pockets 41 of the input shaft 20. The axially facing surfaces 39, 64 of the input shaft 20 and intermediate drive element 24 may touch or lie closely adjacent one another.

The face 68 of the intermediate drive element 24 opposite the axially facing surface 64 thereof comprises a short annular extension 70 which in use is received within a bore 72 formed at the base of the cup shaped end 48 of the output shaft 22. The bore 72 may assist in locating the intermediate drive element 24.

As discussed above, the torque limiting unit 18 further comprises a torsion bar 46 which in use acts as a torsion spring to rotationally bias the input shaft 20 and intermediate drive element 24 relative to one another. As can be seen in FIG. 3 the torsion bar 46 comprises splines 74 (or other drive elements) at opposed ends thereof. A torque tube 76 comprises internal splines or drive elements 78 at an end thereof opposite the drive teeth 44 of the torque tube 76. A second tube 80 also has internal splines or drive elements 82 at an end opposite the drive teeth 42 of the second tube 80. The torque tube 76 and second tube 80 are slidably engaged over the torque bar 46 such that the splines 74 of the torque bar 46 are received by the splines 78, 82 of the torque tube 76 and second tube 80. In this position, the respective drive teeth 42, 44 are generally in abutment with one another.

This torque bar assembly 84 is received in the hollow internal spaces of the input shaft 20, output shaft 22 and intermediate drive element 24. As can be seen in FIG. 2, the end 86 of the torque tube 76 with the splines 78 projects from the output shaft 20. In the assembled condition, the respective drive teeth 42, 44 of the torque bar assembly 84 are received between the dog teeth 38 of the input shaft 20 and the dog teeth 62 of the intermediate drive element 24.

The drive teeth 44 of the torque tube 76 will be received in the pockets 41 of the input shaft 20 and, depending on the direction in which the torsion bar 46 has been wound will engage on either the clockwise facing flanks 40c of the input shaft dog teeth 38 or on the anti-clockwise facing flanks 40ac of the input shaft dog teeth 38. In fact, two drive teeth 44 will be received in each pocket, but only one of those drive teeth 44 will contact a flank 40c, 40ac of the input shaft dog teeth 38. The other drive tooth 44 of each pair will be spaced from the flanks 40 of the input shaft dog teeth 38. That other drive tooth 44 of each pair will however contact either the clockwise facing flank 66c of the intermediate drive element dog tooth 62 or the anti-clockwise facing flank 66ac of the intermediate drive element dog tooth 62 within the pocket 39 of the input shaft 20.

Similarly, the drive teeth 42 of the second tube 80 will be received in the pockets 67 of the intermediate drive element 24 and, depending on the direction in which the torsion bar 46 has been wound will engage on either the clockwise facing flanks 66c of the intermediate drive element dog teeth 62 or on the anti-clockwise facing flanks 66ac of the intermediate drive element dog teeth 62. In fact, two drive teeth 42 will be received in each pocket 67, but only one of those drive teeth 42 will contact a flank 66c, 66ac of the intermediate drive element dog teeth 62. The other drive tooth 42 of each pair will be spaced from the flanks 66 of the intermediate drive element dog teeth 62. That other drive tooth 42 of each pair will however contact either the clockwise facing flank 40c of the input shaft dog tooth 38 or the anti-clockwise facing flank 40ac of the intermediate drive element dog tooth 38 within the pocket 67 of the intermediate drive element 24.

Figure 6:
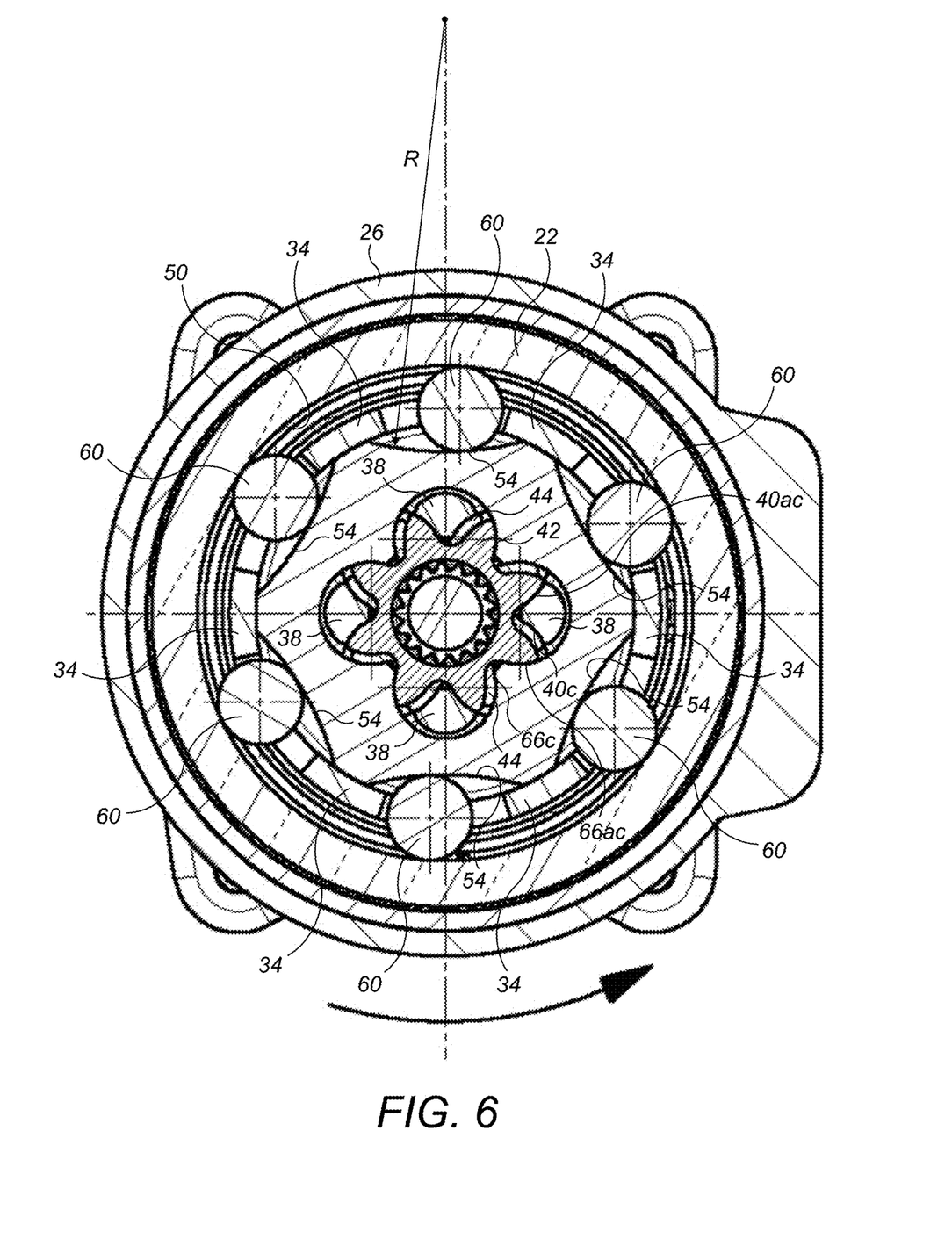
FIG. 6 shows a cross-sectional view through the torque limiting device.

This arrangement can be seen in FIG. 6, where the anti-clockwise flanks 40c of the input shaft dog teeth 38 engage alternate teeth 42 of the second tube 80 and alternate teeth 44 of the torque tube 76 engage the anti-clockwise facing flanks 40ac of the input shaft dog teeth 38.

It will also be seen from FIG. 6 that the drive teeth 42, 44 are rotationally offset from each other. This is due to the twisting of the torsion bar 46. In assembling the torque limiting device 16, the torsion bar 46 is twisted about its longitudinal axis so as to produce a predetermined torque between the torque tube 76 and the second tube 80. Thus the torsion bar assembly 84 acts as a torque spring mechanism. The effect of this torque is to align the input shaft 20 and intermediate drive element in a first angular orientation. In that orientation, the roller jammer elements 60 will sit centrally in the depressions 54 and will not engage the radially inner surface 50 of the output shaft 22. As soon as the input shaft begins to rotate, in either direction the roller jammer elements 60 move along one of the ramped surfaces 56 as can be seen in FIG. 6. In this position, the roller jammer elements 60 will jam against the radially inner surface 50 of the cup shaped end 48 of the output shaft 24, transmitting rotation from the input shaft 20 to the output shaft 24. FIG. 6 illustrates drive in a rotational direction B. In this case, rotation of the input shaft 20 will be transmitted to the output shaft 24 via the anti-clockwise facing flanks 40ac of the dog teeth 38 of the input shaft 20, into the drive teeth 42 of the second shaft 80, through the second shaft 80, into the torsion bar 46 via the spline teeth 74, 82, from the torsion bar 46 into the torque tube 76 via the splines 74, 78, and into the intermediate drive element 24 through the drive teeth 44 of the second shaft 20 engaging the clockwise facing flanks 66c of the dog teeth 62 of the intermediate drive element 24.

Drive will continue to be transmitted in this manner until such time as the torque applied to the input shaft 20 exceeds the predetermined torque set in the torque bar assembly 84. The torsion bar will then wind further, to the extent that the drive teeth 42, 42 will rotate relative to one another such that the input shaft 20 is able to rotate relative to the intermediate drive element 24 from its first position in the direction of torque application. In this situation, the fingers 34 of the input shaft 20 will engage the roller jammer elements 60 and move them towards the bottom of the respective depressions 54 in the intermediate drive element 24. That will move the roller jammer elements 60 out of jamming interaction with the radially inner surface 50 of the output shaft 22, thereby allowing the input shaft 20 to rotate independently of the output shaft 24, thereby preventing the additional torque being transmitted between the input shaft 20 and the output shaft 22.

Thus, in the event of a jam occurring downstream of the output shaft 22, the inertial torque generated by the motor 36 will exceed the pre-set torque of the torque bar assembly 84 and temporarily disconnect the motor 36 from the rest of the system, preventing damage to the system, thereby preventing transmission of excess torque into the rest of the system.

The drive torque limiting device 18 may be configured such that a relatively small amount of relative rotation between the input shaft 20 and the intermediate drive element 24 will bring the fingers 34 of the input shaft 20 into contact with the roller jammer elements 60. For example a rotation of 5 degrees or less may bring the fingers 34 of the input shaft 20 into engagement with the roller jammer elements 60

The torque limiting device 18 may operate in either direction. If rotated in a direction counter to B, then the roller jammer elements 60 will ride up the opposite ramp 56 in each depression 54 to drive in that direction. Drive will then be transmitted from the clockwise facing flanks 40c of the dog teeth 38 of the input shaft 20 into the drive teeth 44 of the torque tube 76, through the torque bar 46 into the drive teeth 42 of the second shaft 80 and from there into the anti-clockwise facing flanks 66ac of the dog teeth 62 of the intermediate drive element 24.

Irrespective of the direction of rotation of the input shaft 20, the torque applied to the torque bar 46 will always act to twist it further.

The torque which can be transmitted by the torque limiting device 18 will be set by the degree of preloading of the torsion spring assembly 84. The more preload applied to the torsion spring assembly 84 during assembly of the torque limiting device 18, the higher the torque that may be transmitted by the torque limiting device 18.

It will be appreciated that modifications may be made to the embodiment described above without departing from the scope of the disclosure. For example, other forms of torsion spring assemblies 84 may be used to provide the torque preload between the input shaft 20 and the intermediate drive element 24.

In addition, while the jammer elements 60 are shown as rollers, other shapes of jammer element 60 may be used provided they are able to move along the ramps 56 of the intermediate drive element depressions 54.

Figure 7:
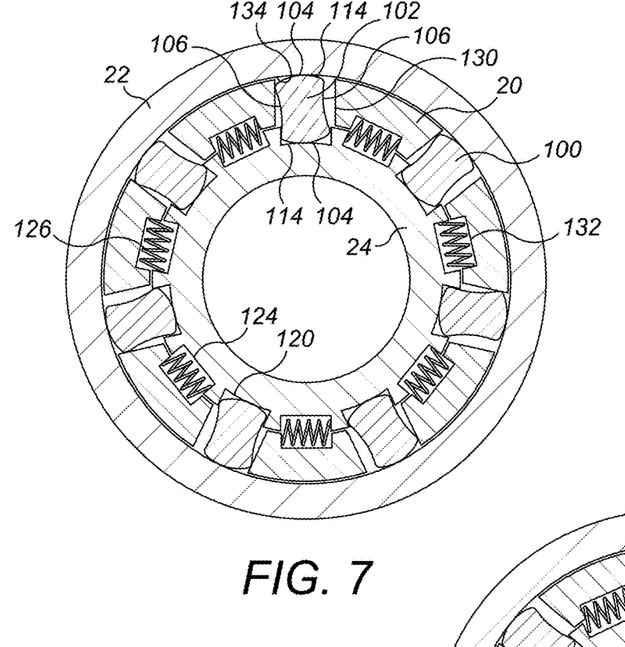
FIG. 7 shows a cross sectional view through a second embodiment of the disclosure in a first operational configuration.
Figure 8:
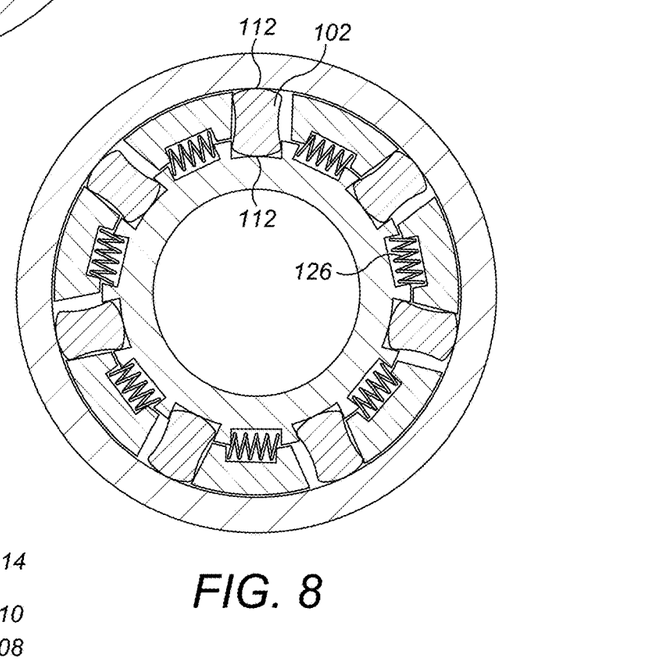
FIG. 8 shows a cross sectional view through the embodiment of FIG. 7 in a second operational configuration.
Figure 9:
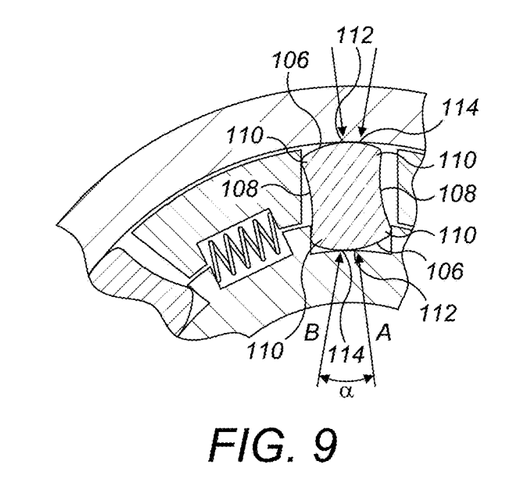
FIG. 9 shows a detail of FIG. 7.

Of course other forms of jamming elements such as sprags may be used. FIGS. 7 to 9 illustrate such a system.

In this system, the jammer elements are not rollers, but lobed pawls 100. Each pawl 100 has a body 102 with enlarged end portions 104. The pawls 100 have curved convex end surfaces 106 and curved concave side surfaces 108. Projecting rounded corners 110 are formed between the end surfaces 106 and the side surfaces 108. The shape of the pawl 100 is such that the length A of the pawl 100 between the crown 112 of the end surfaces 106 is smaller than a length B defined between opposed points 114 on the end surfaces 106 at an angle α to a line defined between the crowns 112. Other shapes of pawl 100 may be used, provided that the "inclined" dimension of the pawl 100 is greater than its "axial" dimension.

The pawls 110 are each received in a first pocket 120 defined on a radially outer surface 122 of a portion of the intermediate drive element 24. The intermediate drive element 24 also comprises a plurality of second pockets 124, each of which receives a spring mechanism in the form of a compression spring 126 which transmits torque from the input shaft 20 to the intermediate drive shaft 24.

The input shaft 20 is formed with a portion surrounding the portion of the intermediate drive element 24 and which has first pockets 130 aligned with the first pockets 120 of the intermediate drive element 24 for receiving the pawls 100 an second pockets 132 aligned with the second pockets 124 of the intermediate drive element 24 for receiving the springs 126. A portion of the output shaft 22 surrounds the pawls 100 as shown.

In operation, the first pockets 120 of the intermediate drive element 24 and the first pockets 130 of the input shaft 20 are aligned by the springs 126 as shown in FIG. 7. In this position, when the input shaft 20 begins to rotate, the pawls 100 are able to tip over from a top dead centre position to a tilted position as shown in FIG. 7. FIG. 7 shows the tilted position when the input shaft rotates in a clockwise direction. The pawls 100 would tilt in the opposite direction with rotation of the input shaft 20 in the opposite direction.

The effect of this is to bring the offset points 114 of the pawls 100 into contact with the radially outer surface 122 of the intermediate drive element 24 at the base 132 of each first pocket 120 and with the radially inner surface 134 of the output shaft, thereby jamming the pawls 100 between these surfaces. Provided the applied torque does not exceed a predetermined value, the springs 126 will maintain the input shaft 20 and intermediate drive shaft 24 in the configuration of FIG. 7. And drive and torque will be transmitted from the input shaft 20 to the output shaft via the intermediate drive element 24 and the pawls 100.

However, should the torque exceed that value, the compression springs 126 will compress, as shown in FIG. 8. This allows the input shaft 20 to rotate relative to the intermediate drive element 24. When this occurs, the side walls 136 of the first pockets 130 of the input shaft 20 will rotate the pawls to the position shown in FIG. 8 in which the pawls 100 adopt a top dead centre position with the crowns 112 of the pawl end surfaces 106 aligned with the radially inner surface 134 of the output shaft 22 and the radially outer surface 122 of the intermediate drive element 24 at the base 132 of each first pocket 120 of the intermediate drive element 24. The length A of the pawl 100 is less than the distance between these opposed radially inner and outer surfaces 134, 122, such that the pawls 100 will no longer transmit torque to the output shaft 22.

It will be appreciated that the springs 126 of the second embodiment can be implemented in the first embodiment in place of the torque bar assembly 84, and vice versa.

Returning now to the overall system, the torque limiting device 18 may, as shown, be connected to an output of the drive motor 36 upstream of the transmission shafts 12, 28. This will allow the drive to be disconnected from the entire actuator system and avoids asymmetrical operation of the slats 4 or flaps 22. However, it could also be positioned elsewhere.

While the torque limiting device 18 described herein will operate in both rotational directions, other devices may operate with rotation in just a single direction.

Also, while the torque limiting device 18 has been described in the context of an aircraft actuator system, it could of course be applied in other drive systems.

The invention claimed is:

1. A torque limiting device comprising:
a rotationally mounted input shaft;
a rotationally mounted output shaft;
an intermediate drive element rotationally coupled to the input shaft;
a plurality of jammer elements mounted between the intermediate drive element and the output shaft; and
a spring mechanism connected between the input shaft and the intermediate drive element for aligning the intermediate drive element and the input shaft in a driving configuration in which rotation of the input shaft at a torque below a predetermined threshold is transmitted to the output shaft via the jammer elements, but in which torque above the predetermined threshold moves the input shaft rotationally relative to the intermediate drive element against the force of the spring mechanism so as to disengage that jammer elements from driving engagement with the output shaft.

2. The torque limiting device as claimed in claim 1, wherein the intermediate drive element comprises a plurality of circumferentially spaced depressions having ramped edge surfaces, along which the jammer elements may move to engage a radially inner surface of the output shaft to transmit torque thereto, or wherein the input shaft and the intermediate drive element have opposed pockets which receive pawls which are able to rotate or tilt into engagement with the radially inner surface of the output shaft to transmit torque thereto.

3. The torque limiting device as claimed in claim 1, wherein the input shaft comprises a first set of dog teeth each dog tooth comprising a clockwise facing flank and an opposed anti-clockwise facing flank and the intermediate drive element comprises a second set of axially projecting dog teeth, each comprising a clockwise facing flank and an opposed anti-clockwise facing flank the first and second sets of dog teeth axially overlapping with the dog teeth of the first set of dog teeth circumferentially interposed between the dog teeth of the second set of dog teeth.

4. The torque limiting device as claimed in claim 3, wherein the flanks of the dog teeth of the input shaft extend rearwardly into the input shaft to define pockets in the input shaft into which the dog teeth of the intermediate drive element extend, and the flanks of the dog teeth of the intermediate drive element extend rearwardly into the intermediate drive element to define pockets in the intermediate drive element into which the dog teeth of the input shaft extend.

5. The torque limiting device as claimed in claim 1, wherein the input shaft comprises a plurality of axially extending actuating fingers which extend circumferentially between the jammer elements such that rotation of the input shaft relative to the intermediate drive element will cause the axially extending fingers to engage the jammer elements to move the jammer elements out of driving engagement with the outer shaft.

6. The torque limiting device as claimed in claim 5, wherein the torsion spring assembly comprises a torsion bar rotationally coupled to the input shaft and the intermediate element.

7. The torque limiting device as claimed in claim 6, further comprising a first set of drive teeth rotationally coupled to a first end of the torsion bar and a second set of drive teeth rotationally coupled to a second end of the torsion bar; the first set of drive teeth and the second set of drive teeth engaging the flanks of the first and second sets of dog teeth for transmitting drive thereto.

8. The torque limiting device as claimed in claim 1, wherein the spring mechanism comprises a torsion spring assembly.

9. The torque limiting device as claimed in claim 1, wherein the spring mechanism comprises one or more compression springs arranged between the input shaft and the intermediate drive element, the springs optionally being mounted in opposed pockets formed in opposed surfaces of the input shaft and intermediate drive element.

10. The torque limiting device as claimed in claim 1, wherein the device is configured such that a rotation of the input shaft relative to the intermediate drive element of 8 degrees or less will disconnect the input shaft from the output shaft.

11. An actuator drive system comprising:
an actuator;
a drive motor connected to the actuator via a drive transmission shaft, and a torque limiting device as claimed in claim 1 arranged between the transmission shaft and the drive motor.

12. The actuator drive system as claimed in claim 11, wherein the drive motor is an electric motor.

13. The actuator drive system as claimed in claim 11, wherein the torque limiting device is provided at an output to the drive motor.

14. The aircraft comprising an actuator drive system as claimed in claim 11 the actuator drives a wing leading edge slat.

15. A method of limiting torque transmitted from an input shaft to an output shaft, the method comprising:
transmitting torque from the input shaft via a plurality of jammer elements arranged between the output shaft and an intermediate drive element rotationally coupled to the input shaft through a pre-loaded spring mechanism such that the input shaft rotates with the intermediate drive element when the torque applied to the input shaft does not exceed a predetermined torque generated between the input shaft such that the jammer elements will remain in driving engagement with the output shaft, but application of a torque greater than the predetermined torque will cause rotation of the input shaft relative to the intermediate drive element thereby disengaging the driving engagement between the jammer elements and the output shaft.

* * * * *